United States Patent
Liu et al.

(10) Patent No.: US 12,349,670 B1
(45) Date of Patent: Jul. 8, 2025

(54) METHOD FOR REDUCING SEED PRODUCTION OF BARNYARD GRASS IN PADDY FIELDS

(71) Applicant: Northeast Institute of Geography and Agroecology, Chinese Academy of Sciences, Changchun (CN)

(72) Inventors: Bo Liu, Changchun (CN); Ming Jiang, Changchun (CN); Haitao Wu, Changchun (CN); Yuanchun Zou, Changchun (CN); Wenguang Zhang, Changchun (CN); Luyao Wang, Changchun (CN); Yuan Pan, Changchun (CN); Xudong Zhang, Changchun (CN)

(73) Assignee: Northeast Institute of Geography and Agroecology, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/944,614

(22) Filed: Nov. 12, 2024

(30) Foreign Application Priority Data

Apr. 15, 2024 (CN) .......................... 202410444238.7

(51) Int. Cl.
*A01M 21/02* (2006.01)
*A01G 22/22* (2018.01)

(52) U.S. Cl.
CPC ............. *A01M 21/02* (2013.01); *A01G 22/22* (2018.02)

(58) Field of Classification Search
CPC ................................................... A01G 22/22
See application file for complete search history.

(56) References Cited

FOREIGN PATENT DOCUMENTS

| CN | 112997825 A | 6/2021 |
|---|---|---|
| CN | 117581735 A | 2/2024 |

OTHER PUBLICATIONS

Smith et al.; Weeds and Their Control in Rice Production; Agriculture Hnadbook No. 292; pp. 1-8 (Year: 1966).*
Husrev Mennan, Mathieu Ngouajio, Mevlut Sahin, Dogan Isik, Emine Kaya Altop, Competitiveness of rice (*Oryza sativa* L.) cultivars against *Echinochloa crus-galli* (L.) Beauv. in water-seeded production systems, Crop Protection, vol. 41 (Year: 2012).*
Bhagirath S. Chauhan, David E. Johnson, Implications of narrow crop row spacing and delayed *Echinochloa colona* and *Echinochloa crus-galli* emergence for weed growth and crop yield loss in aerobic rice, Field Crops Research (Year: 2010).*
Anonymous, Jinhua Agricultural Experimental Station Science and Technology Information Group Barnyard grass and its control, Today Science & Technology, 1972-12-31, pp. 1-3, No. 20 Claims involved: 1-6.

(Continued)

*Primary Examiner* — Monica L Perry
*Assistant Examiner* — Brittany A Lowery
(74) *Attorney, Agent, or Firm* — Pilloff Passino & Cosenza LLP; Rachel K. Pilloff; Sean A. Passino

(57) ABSTRACT

A method for reducing seed production of barnyard grass in paddy fields is provided in the present application. The method for reducing seed production of barnyard grass in paddy fields includes: 1: selecting plots; 2: monitoring plant height; 3: observing seeds; 4: mowing barnyard grass; 5: utilizing barnyard grass; and 6: measuring seed yield. The method includes no hormones or pesticides.

6 Claims, 3 Drawing Sheets

(56) References Cited

OTHER PUBLICATIONS

Li Chengquan, Study on the harm and control of barnyard grass in rice field, Journal of Anhui Agricultural Sciences, Dec. 30, 1963, full text, No. 4, pp. 16-22 Claims involved: 1-6.
Anonymous, The annual occurrence of more than 1.4 billion mu of weeds continues to increase. Experts give the technical scheme of scientific weed control, Farmer's Digest, Jun. 1, 2019, No. 6, pp. 35-37 full text Claims involved: 1-6.
Zhou Zhengchun, et al., Effect of barnyard grass damage on early rice yield, China Plant Protection, Aug. 20, 2013, vol. 33, No. 8, pp. 33-35 Claims involved: 1-6.
Retrieval report dated May 11, 2024 in SIPO application No. 202410444238.7.
Retrieval report dated Jun. 11, 2024 in SIPO application No. 202410444238.7.
Notification to Grant Patent Right for Invention dated Jun. 18, 2024 in SIPO application No. 202410444238.7.
Office action dated Jun. 1, 2024 in SIPO application No. 202410444238.7.
Office action dated May 16, 2024 in SIPO application No. 202410444238.7.

* cited by examiner

METHOD FOR REDUCING SEED PRODUCTION OF BARNYARD GRASS IN PADDY FIELDS

CROSS-REFERENCE TO RELATED APPLICATIONS

This application claims priority to Chinese Patent Application No. 202410444238.7, filed on Apr. 15, 2024, the contents of which are hereby incorporated by reference.

TECHNICAL FIELD

The present disclosure relates to a method for reducing malignant weeds in paddy fields.

BACKGROUND

Rice is one of the world's three major food crops and an important resource for agricultural production, ranking foremost in China's food security system. There are many adverse effects on rice production, such as the spread of various weeds that compete with rice for water and fertilizer, as well as plant diseases and insect pests induced by the deterioration of the microclimate in the field, which are among the most important factors affecting the normal growth of the rice seedlings. Most of the barnyard species (*Echinochloa* spp.) are field weeds, which are widely distributed and classified as vicious weeds worldwide. In China, the damage of barnyard species (*Echinochloa crus-galli*) to paddy fields ranks first among the 15 serious weeds in agricultural fields.

Herbicide is currently an important means of controlling weeds in agricultural fields. Since barnyard grass and rice are both grass plants with similar ecological and biological characteristics, it is difficult to control barnyard grass with the use of herbicides. As a result of the massive use of herbicides, it is becoming more difficult to control barnyard grass and other drug-resistant plants. As a result of the massive use of herbicides, the weeds, such as barnyard grass and other drug-resistant plants, have gradually become more difficult to be controlled in the paddy field. Long-term application of chemical herbicides has failed to control the weed infestation, and the problem is becoming more and more prominent, even causing deterioration of the soil environment in agricultural fields. Barnyard grass is an annual malignant weed with extremely high seed productivity. At present, the main ways to control the emergence or growth of barnyard grass seedlings in ecological prevention and eradication are through flooding and covering with straw material, but these methods are difficult to achieve the purpose of controlling barnyard grass.

SUMMARY

The objective of the present disclosure is to provide a method for reducing seed production of barnyard grass in paddy fields in order to solve the technical problem that it is difficult to achieve control of barnyard grass by existing methods of preventing and eradicating tares in paddy fields.

Steps of the method for reducing seed production of barnyard grass in paddy fields are as follows:

step 1, selecting plots: selecting plots planted with rice and are seriously damaged by barnyard grass as treatment objects;

step 2, monitoring plant height: after rice transplanting for 1-2 months, monitoring rice and barnyard grass in terms of plant height, randomly selecting 3-10 plants in a 2 square meter ($m^2$) quadrat, vertically measuring a height from a ground to tops of the plants, taking an average of 3-10 plants, and calculating a height difference between barnyard grass and rice;

step 3, observing seeds: observing the seeds on barnyard grass ears in terms of development, collecting seeds of a whole ear, removing impurities and air drying, then measuring a seed viability by a germination method, where seeds are considered viable if germinated, and calculating a proportion of viable seeds, and ensuring that little or no seed is shed on the ear prior to implementing step 4;

step 4, mowing barnyard grass: when an average height of barnyard grass is 3 centimeters greater than that of rice, cutting off all barnyard grass plants on a premise of not destroying rice plants;

step 5, utilizing barnyard grass: repeating the step 4 for 1-6 times, and taking all barnyard grass materials cut out of the plots for making silage or directly feeding, preventing weed seeds from entering a farmland again; and step 6, measuring seed yield: when few barnyard grass plants grow taller than rice for 7 consecutive days, determining a yield of barnyard grass seeds per unit area after treatment of step 5, and completing a reduction of seed production of barnyard grass in paddy fields.

The present disclosure is established on the basis of many years of observation of barnyard grass and rice growth pattern in the field, which does not affect the normal growth of rice, and is capable of significantly reducing barnyard grass seed production;

no hormones or pesticides are used in the implementation process of the present disclosure, and the cut barnyard grass plants are fully utilized, which is eco-friendly and meets the requirements of developing ecological organic agriculture; and the observation, cutting and other methods used in the present disclosure are simple and easy to understand, and easy to popularize and apply.

DETAILED DESCRIPTION OF THE EMBODIMENTS

The technical scheme of the present disclosure is not limited to the specific embodiments list below, but also includes any combination among the specific embodiments.

Figure 3:
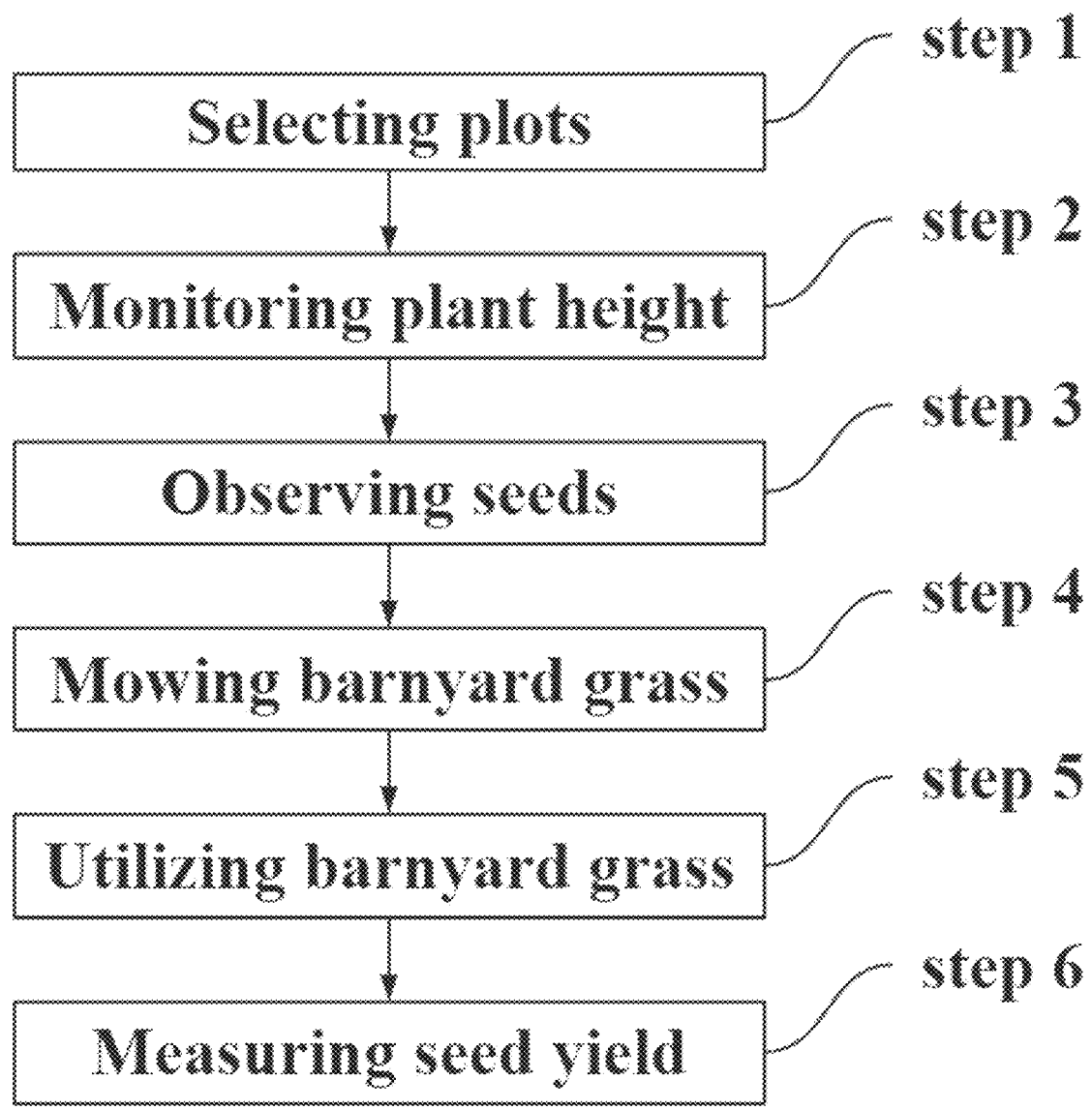
FIG. 3 shows a process illustrating the method for reducing seed production of barnyard grass in paddy fields.

Specific implementation 1: as shown in FIG. 3, the method for reducing seed production of barnyard grass in paddy fields in this embodiment is carried out according to the following steps:

step 1, selecting plots: selecting plots planted with rice and are seriously damaged by barnyard grass as treatment objects;

step 2, monitoring plant height: after rice transplanting for 1-2 months, monitoring rice and barnyard grass in terms of plant height, randomly selecting 3-10 plants in a 2 square meter ($m^2$) quadrat, vertically measuring a height from a ground to tops of the plants, taking an average of 3-10 plants, and calculating a height difference between barnyard grass and rice;

step 3, observing seeds: observing the seeds on barnyard grass ears in terms of development, collecting seeds of a whole ear, removing impurities and air drying, then measuring a seed viability by a germination method, where seeds are considered viable if germinated, and calculating a proportion of viable seeds, and ensuring that little or no seed is shed on the ear prior to implementing step 4;

step 4, mowing barnyard grass: when an average height of barnyard grass is 3 centimeters greater than that of rice, cutting off all barnyard grass plants on a premise of not destroying rice plants;

step 5, utilizing barnyard grass: repeating the step 4 for 1-6 times, and taking all barnyard grass materials cut out of the plots for making silage or directly feeding, preventing weed seeds from entering a farmland again; and step 6, measuring seed yield: when few barnyard grass plants grow taller than rice for 7 consecutive days, determining a yield of barnyard grass seeds per unit area after treatment of step 5, and completing a reduction of seed production of barnyard grass in paddy fields.

Specific implementation 2: this specific implementation is different from Specific implementation 1 in that the plant height of rice and barnyard grass is monitored one month after rice transplanting in step 2. Others are the same as the Specific implementation 1.

Specific implementation 3: the difference between this specific implementation and Specific implementation 1 or 2 is that after 1.5 months of rice transplanting in step 2, the plant height of rice and barnyard grass is monitored. Others are the same as those in Specific implementation 1 or 2.

Specific implementation 4: this specific implementation is different from Specific implementation 1 to Specific implementation 3 in that the plant height of rice and barnyard grass is monitored two months after rice transplanting in step 2. Others are the same as those in the first to Specific implementation 3.

Specific implementation 5: this specific implementation is different from Specific implementation 1 to Specific implementation 4 in that in step 2, 6 plants are randomly selected in a quadrat of 2 $m^2$, the height from the ground to the top of the plant is measured vertically, and the average value of 6 plants is taken. Others are the same as one of the Specific implementations 1-4.

Specific implementation 6: this specific implementation is different from one of Specific implementations 1 to 5 in that step 4 is repeated five times in step 5. Others are the same as one of the Specific implementations 1-4.

The following embodiments are adopted to verify that effect of the present disclosure:

EMBODIMENTS

The method for reducing seed production of barnyard grass in paddy fields is carried out according to the following steps:

step 1, selecting plots: selecting plots planted with rice and seriously damaged by barnyard grass as treatment objects;

step 2, monitoring plant height: at the beginning of July, that is, 1-2 months after rice transplanting, the plant height of rice and barnyard grass is monitored, and 6 plants are randomly selected in a 2 $m^2$ quadrat, and the height from the ground to the top of the plants is measured vertically, and the average of 6 plants is taken to calculate the height difference between barnyard grass and rice;

step 3, observing the seeds: observing the development of the seeds on the barnyard grass ear, collecting the seeds in the whole ear, removing impurities and air drying, measuring the seed vigor by a germination method, and calculating the proportion of the seeds with vigor to ensure that the seeds on the ear hardly fall off before the implementation of step 4;

step 4, mowing barnyard grass: when the average height of barnyard grass is more than 10 centimeters of rice, all easily recognizable barnyard grass plants, especially those that have produced fruit ears, are cut off on the premise of not destroying rice plants;

step 5, utilizing barnyard grass: repeating the step 4 for 1-6 times, and taking all the barnyard grass materials cut out of the plots for making silage or directly feeding, preventing weed seeds from entering the farmland again; and step 6, measuring seed yield: when the plant height growth of barnyard grass rarely exceeds that of rice for 7 consecutive days, the yield of barnyard grass seeds per unit area after the treatment in step 5 is measured to reduce the production of barnyard grass seeds in paddy fields.

The effect of this embodiment on reducing the seed production of weeds in paddy fields is verified by the following experiments.

The experimental group and the control group are set up to detect the seed yield of barnyard grass per unit area.

Experimental group: experiment is carried out by changing the times of mowing barnyard grass in step 4 in this embodiment. When the average plant height of barnyard grass is about 10 cm higher than that of rice, mowing is carried out, and the mowing times are 1, 2, 3 and 4 times respectively.

Control group: different from the experimental group in that barnyard grass is not mowed in step 4, and other treatments are the same as the experimental group.

In this embodiment, all experimental groups are mowed for the first time on July 20th, and mowed every 7 days thereafter. For each treatment in the experimental group, after all mowing, the seed setting of barnyard grass in the quadrat is observed, and the mature ear is cut off, and the obtained seeds are used for the final seed yield statistics. Seven days after four mowing treatments ($17^{th}$, August), all barnyard grass plants in the quadrat are carefully picked out to obtain barnyard grass seeds, and finally the seed yield per square meter of each treatment is calculated cumulatively.

Figure 1:
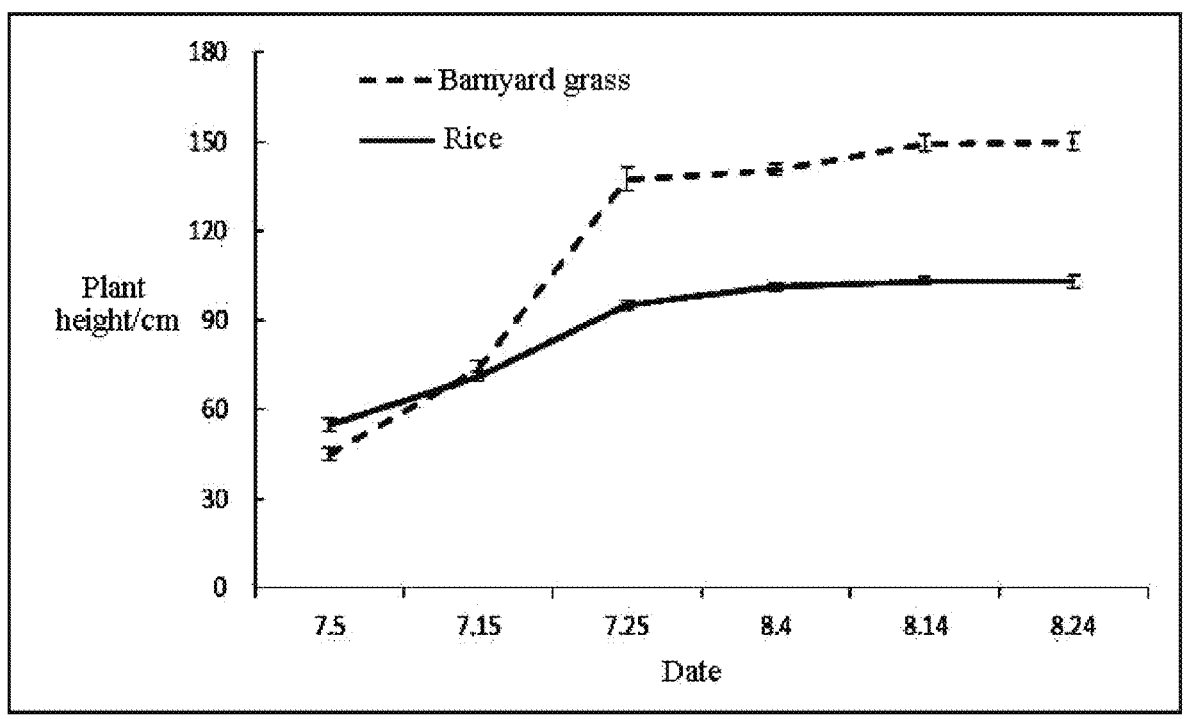
FIG. 1 is a comparative diagram of plant height changes of rice and barnyard grass in the paddy field system of Songnen Plain in Embodiment 1.
Figure 2:
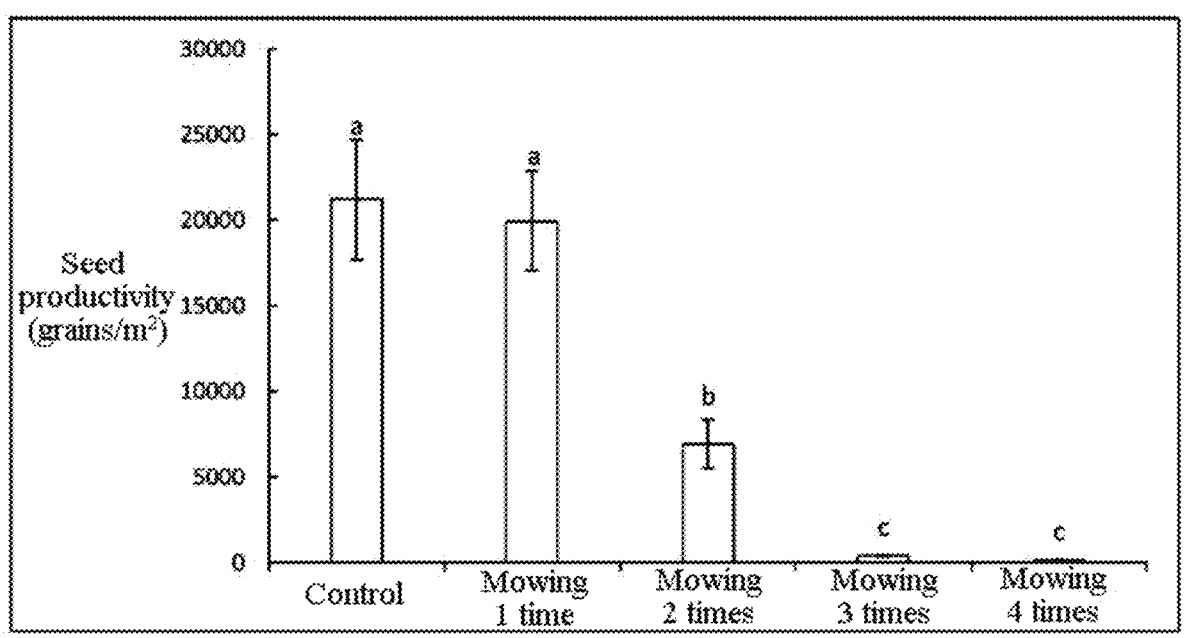
FIG. 2 shows the effect of different mowing times on barnyard grass seed production in the Embodiment 1 (different lowercase letters on the bar chart indicate that the difference reaches a significant level).

In the paddy field system of Songnen Plain, the plant height growth law of rice and its companion plant barnyard grass is shown in FIG. 1. Before mid-July, the average plant height of barnyard grass is generally smaller than that of rice; in the middle and late July, under the influence of rain and heat, barnyard grass enters a rapid growth period, and the plant height gradually begin to exceed that of rice; from the end of July to the beginning of August, the height growth of rice basically is stopped, and the height difference between them is about 30 cm. As may be seen from Table 1, barnyard grass begins to ear in the rice field in mid-July, and the proportion of viable seeds is increased continuously, but almost no seeds fall off the ear. In August, the proportion of viable seeds reaches more than 70%, and the mature barnyard grass seeds gradually begin to fall off. Different mowing times have obvious effects on the seed production of barnyard grass ($F=479.3$, $P<0.001$). As may be seen from FIG. 2, compared with the control group, the seed production of barnyard grass is almost unaffected when mowing once; when mowing twice, the seed production of barnyard grass is decreased by about 67%; there is no significant difference between mowing for three times and mowing for four times, but the seed production of barnyard grass is decreased by more than 98%. Therefore, in the rice field system of Songnen Plain, barnyard grass is easy to identify after its height begins to exceed that of rice. Through mowing for more than three times in a row, the production of barnyard grass seeds is greatly reduced.

The method provided in this experiment is simple and easy to understand, which may reduce the seed production of barnyard grass in paddy fields by more than 98%.

TABLE 1

| Characteristics of barnyard grass seed maturity in paddy field | | | | | | |
|---|---|---|---|---|---|---|
| Date | 7.5 | 7.15 | 7.25 | 8.4 | 8.14 | 8.24 |
| Proportion of viable seeds/% | Seeds are not formed | 10.1 ± 2.4 | 36.9 ± 5.6 | 74.5 ± 10.3 | 84.6 ± 9.3 | 86.9 ± 11.2 |
| Shedding | | | Very little shedding | Shedding in small quantities | Shedding in large quantities | |

What is claimed is:

1. A method for reducing seed production of barnyard grass in paddy fields, wherein steps of the method for reducing the seed production of the barnyard grass in the paddy fields are as following:

I: selecting plots: selecting plots planted with rice and are seriously damaged by barnyard grass as treatment objects;

II: monitoring plant height: after rice transplanting for 1-2 months, monitoring plant heights of rice and barnyard grass, randomly selecting 3-10 plants in a small quadrat of 2 m², vertically measuring a height from a ground to tops of the plants, taking an average of 3-10 plants, and calculating a height difference between barnyard grass and rice;

III: observing seeds: observing the seeds on barnyard grass ears in terms of development, collecting seeds of a whole ear, removing impurities and air drying, then measuring a seed viability by a germination method, wherein seeds are considered viable if germinated, and calculating a proportion of viable seeds, and ensuring that little or no seed is shed on the ear prior to implementing a step IV;

IV: mowing barnyard grass: when an average height of barnyard grass is 3 centimeters greater than rice, cutting off all barnyard grass plants on a premise of not destroying rice plants;

V: utilizing barnyard grass: repeating the step IV for 3-6 times, and taking all barnyard grass materials cut out of the plots for making silage or directly feeding, preventing weed seeds from entering a farmland again; and VI: measuring a seed yield: when few barnyard grass plants grow taller than rice for 7 consecutive days, determining a yield of barnyard grass seeds per unit area after treatment of a step V, and completing a reduction of seed production of the barnyard grass in paddy fields.

2. The method for reducing the seed production of the barnyard grass in the paddy fields according to claim 1, wherein in a step II, the plant heights of rice and barnyard grass is monitored one month after rice transplanting.

3. The method for reducing the seed production of the barnyard grass in the paddy fields according to claim 1, wherein in a step II, after 1.5 months of rice transplanting, the plant heights of rice and barnyard grass is monitored.

4. The method for reducing the seed production of the barnyard grass in the paddy fields according to claim 1, wherein in a step II, the plant heights of rice and barnyard grass are monitored two months after rice transplanting.

5. The method for reducing the seed production of the barnyard grass in the paddy fields according to claim 1, wherein in a step II, 6 plants are randomly selected in the small quadrat of 2 m², and the height from the ground to the tops of the plants is measured vertically, and an average value of the 6 plants is taken.

6. The method for reducing the seed production of the barnyard grass in the paddy fields according to claim 1, wherein the step IV is repeated 5 times in the step V.

\* \* \* \* \*